March 19, 1957      O. H. BANKER      2,785,582
AUXILIARY TWO-SPEED TRANSMISSION
Filed June 25, 1954      3 Sheets-Sheet 1
FIG. 1
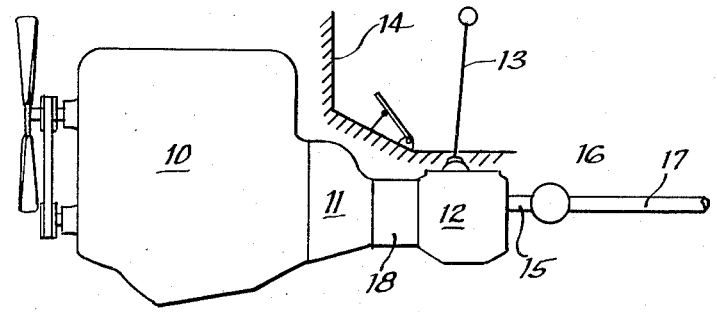
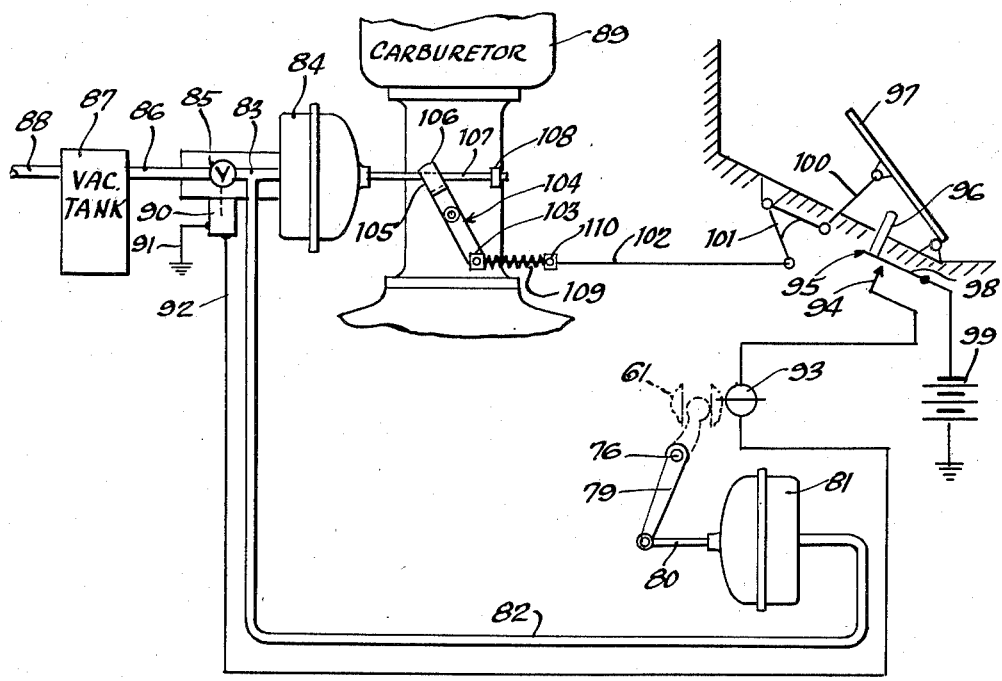
FIG. 2
INVENTOR.
Oscar H. Banker
BY
Charles N. Vnytech
Att'y

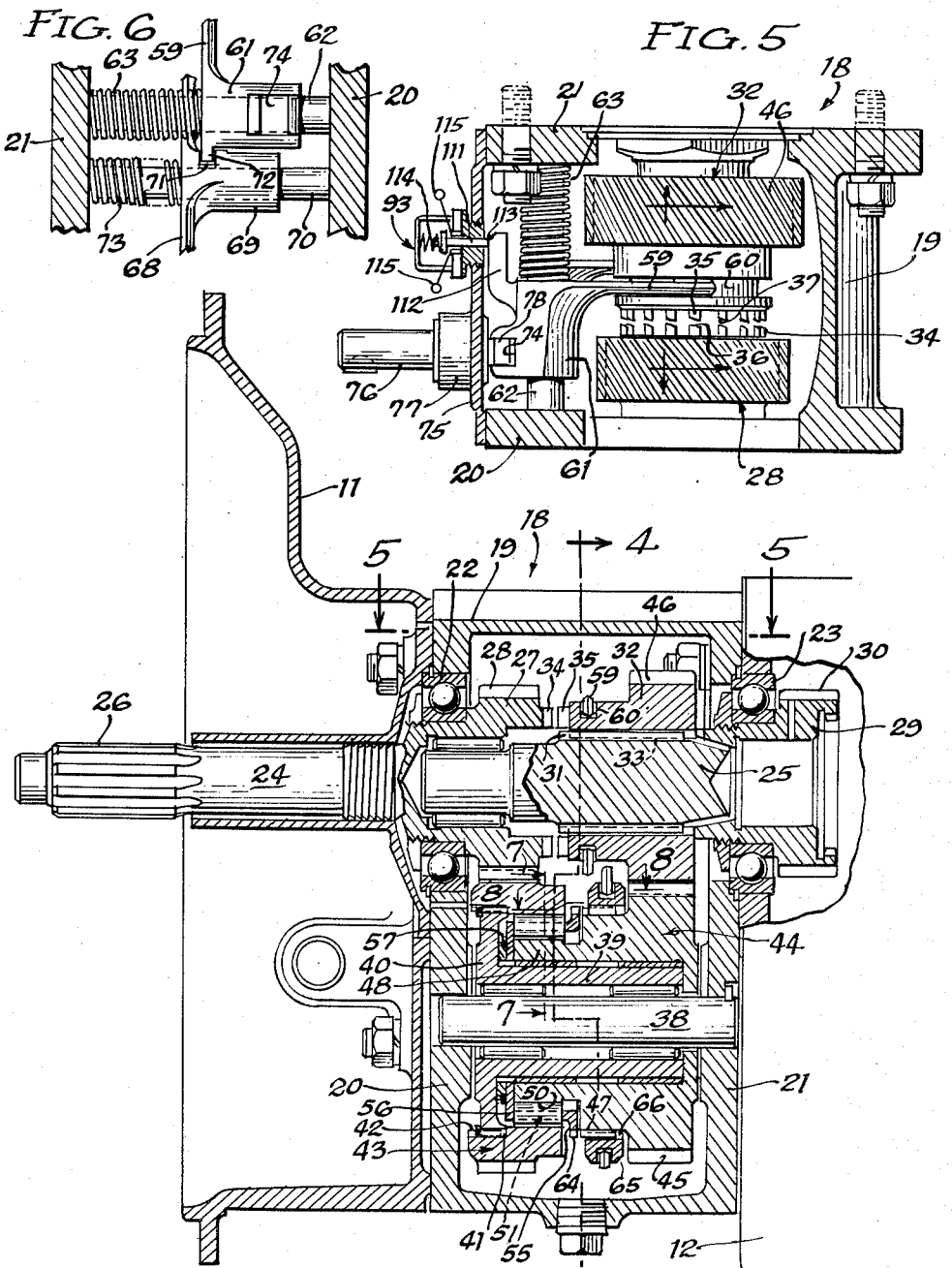

March 19, 1957  O. H. BANKER  2,785,582
AUXILIARY TWO-SPEED TRANSMISSION
Filed June 25, 1954  3 Sheets-Sheet 3

INVENTOR.
Oscar H. Banker
BY
Charles H. Vojtech
Att'y

United States Patent Office 2,785,582
Patented Mar. 19, 1957

2,785,582
AUXILIARY TWO-SPEED TRANSMISSION

Oscar H. Banker, Evanston, Ill., assignor to New Products Corporation, Chicago, Ill., a corporation of Delaware Application June 25, 1954, Serial No. 439,276

10 Claims. (Cl. 74—472)

This invention relates to a semi-automatic transmission for automotive vehicles and it will be described for illustrative purposes with reference to its application to heavy equipment such as trucks, buses, tractors, etc.

Trucks and other heavy automotive equipment are generally provided with an engine which is adequate for relatively high speed travel on level roads with a full load, but which is sensitive to changes in road inclination and quickly slows down when the truck ascends even a moderate hill. The engine is also incapable of providing sudden acceleration for passing other vehicles, or to avoid a dangerous situation, without changing to a lower speed (higher torque) ratio in the transmission associated with the output of the engine. Shifting the transmission cannot always be effected in the time available, and because of the effort required of the truck driver, it is sometimes neglected. A more serious defect in the transmission, however, is that, although the average truck transmission provides five forward speed ratios, the difference between successive ratios is still too great to provide the desired performance for the truck.

It is a general object of this invention to provide an auxiliary two-speed transmission for an automotive vehicle which will provide a quickly and readily available higher torque for accelerating the vehicle under the control of the driver.

Another object of this invention is the provision of a two-speed auxiliary transmission for an automotive vehicle which will quickly produce a speed ratio intermediate any two ratios available in the transmission with which the vehicle is equipped, to provide additional acceleration for the vehicle whenever it is desired.

It is also an object of this invention to provide an auxiliary two-speed transmission for automotive vehicles which will be interposed in the drive line from the vehicle engine ahead of the regular transmission and which will provide an immediately available "lower" ratio for greater acceleration.

As a more specific object, this invention seeks to provide a two-speed auxiliary transmission for an automotive vehicle which is automatically operable in conjunction with the operation of the accelerator pedal of the vehicle to provide increased acceleration after the accelerator pedal has been depressed to its wide open throttle position, and then is automatically rendered inoperative upon a release of the accelerator pedal to its idling position.

A feature of this invention is a control for a roller type one-way clutch used in a semi-automatic auxiliary transmission which automatically and positively holds the rollers in an inoperative position when the one-way clutch is not in use.

These and other objects and features of this invention will become apparent from the following detailed description when taken together with the accompanying drawings in which:

Fig. 1 is a schematic side elevational view of an automotive engine and transmission with the auxiliary transmission of this invention applied thereto;

Fig. 2 is an enlarged schematic diagram of the vacuum and electrical controls for the auxiliary transmission;

Fig. 3 is a side elevational view in section of the auxiliary transmission taken along line 3—3 of Fig. 4;

Fig. 5 is a plan view in section of the transmission of Fig. 4 taken along line 5—5 thereof;

Fig. 6 is a fragmentary rear elevational view of the shift rails for the auxiliary transmission;

Figure 7:
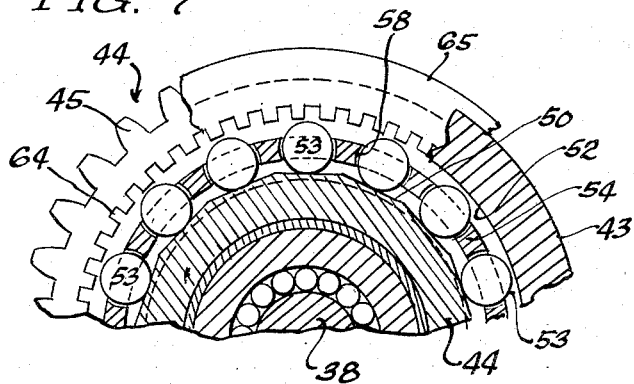
Fig. 7 is a fragmentary front elevational view of the one-way clutch used in the auxiliary transmission and the control therefor.
Figure 8:
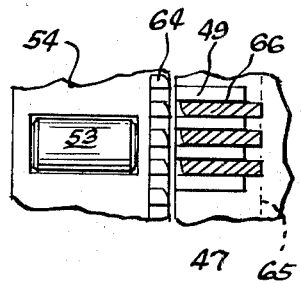
Fig. 8 is a fragmentary plan view of the one-way clutch and control therefor taken along line 8—8 of Fig. 3.

Referring now to the drawings for a detailed description of the invention there is depicted in Fig. 1 an engine 10 which may be an internal combustion engine of the type and size suitable for use in powering trucks, buses or the like. A clutch, shown diagrammatically at 11, is secured to the output of engine 10, and a manually operated multi-speed transmission 12 is connected in the drive line from clutch 11 and is controlled by a shift lever 13 extending upwardly into the cab 14 of the vehicle. The output shaft 15 of transmission 12 is connected through a universal joint 16 to the drive shaft 17 of the vehicle, it being understood that drive shaft 17 is connected through suitable differential gearing to the drive wheels of the vehicle. The differential gearing and drive wheels are omitted from the diagram for simplicity. The auxiliary two-speed transmission of this invention is inserted between clutch 11 and transmission 12 and is designated by a rectangle 18.

Referring now to Fig. 3, the auxiliary two-speed transmission is comprised of a housing 19 which includes end walls 20 and 21. Aligned bearings 22 and 23 are disposed in the upper portions of end walls 20 and 21, respectively, and support input shaft 24 and output shaft 25, respectively. Input shaft 24 has splines 26 at the forward end thereof for engagement with the hub (not shown) of friction clutch 11 and which connects shaft 24 to the crankshaft of engine 10. Shaft 24 extends into housing 19 and has a belled end 27, upon the exterior peripheral surface of which is formed an input gear 28.

Output shaft 25 extends from end wall 21 to end wall 20 and is received within the belled end 27 of input shaft 24 so as to be supported thereby. Shaft 25 extends outwardly of housing 19 and is formed with a belled end 29 upon the outer peripheral surface of which is formed the input gear 30 of transmission 12. The exterior surface of the portion of shaft 25 within housing 19 and adjacent end wall 21 is formed with straight splines 31 upon which is mounted a sliding gear 32 formed with internal straight splines 33 which mesh with splines 31 to provide a positive driving connection between shaft 25 and gear 32.

Input gear 28 has teeth 34 formed on the inner end thereof which are aligned with similar teeth 35 formed on the adjacent end of gear 32. As shown more clearly in Fig. 5, the abutting ends of teeth 34, 35 are formed with chamfers 36, 37, respectively, which causes said teeth to resist interengagement when input gear 27 rotates faster than gear 32, but which assists in effecting an interengagement between teeth 34, 35 when gear 28 tends to rotate at a slower speed than gear 32. Teeth 34 and 35 thus comprise the two elements of a Maybach type of jaw clutch and cannot be engaged until the two elements of the clutch are rotating at substantially the same speed.

In the space below gears 28 and 32 there is provided a countershaft 38 on which is rotatably mounted a sleeve 39 having a flange 40 formed on the left hand end thereof as viewed in Fig. 3. The outer periphery of flange 40 is formed with teeth 41 which engage internal teeth 42 on a first countershaft gear 43. The latter gear is constantly in mesh with input gear 28 and hence rotates whenever shaft 24 rotates.

Rotatably mounted on sleeve 39 is a second countershaft gear 44 the teeth 45 of which are constantly in engagement with the teeth 46 on gear 32. Gear 44 has stepped regions 47 and 48 of progressively smaller diameter, stepped region 47 being provided with external teeth 49 and stepped region 48 being formed with a plurality of flat surfaces 50 which constitute the cams of a one-way roller clutch indicated generally at 51.

Figure 4:
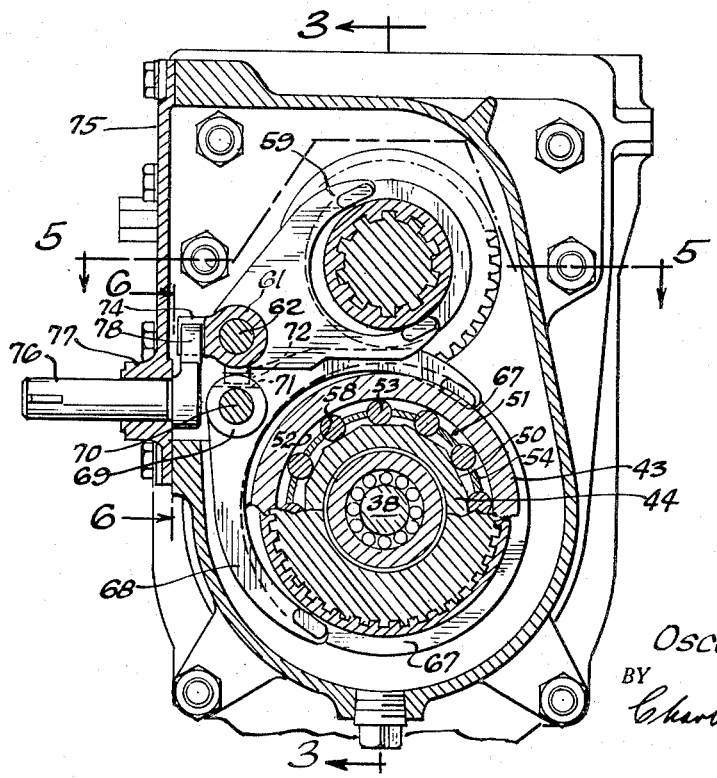
Fig. 4 is a front elevational view, in section, of the transmission of Fig. 3 taken along line 4—4 thereof.

As shown more clearly in Fig. 4, one-way clutch 51 includes, in addition to the flat surfaces 50, a cylindrical surface 52 formed on the interior of gear 43 and telescoped over surfaces 50, and a plurality of rollers 53 interposed in the space between the surfaces 50 and cylindrical surface 52. The rollers are disposed with their axes parallel to the axis of countershaft 38 and are held in place by a roller cage 54 which, as shown in Fig. 3, is a cylindrical element having a radially outwardly extending flange 55 at the end adjacent teeth 49 and an inwardly extending flange 56 at the opposite end thereof, said inwardly extending flange 56 being held against axial movement on stepped region 48 by a snap ring 57. Rollers 53 are retained in slots 58 (Fig. 4) in cage 54 and can be moved simultaneously in a circumferential direction by an appropriate movement of cage 54.

When rollers 53 are disposed in the centers of the flat surfaces 50, their diameters are such that they are out of contact with cylindrical surface 52 and hence there is no driving connection between the cylindrical surface 52 and flat surfaces 50. Under such conditions gear 43 can rotate independently of gear 44. When cage 54 is rotated in a counterclockwise direction as viewed in Fig. 4 until rollers 53 contact both flat surfaces 50 and the cylindrical surface 52, a drive is established between gear 43 and gear 44 assuming that gear 43 is rotating in a counterclockwise direction and that gear 44 tends to lag behind gear 43.

The gearing thus far described is adapted to provide two speeds forward, the speeds being direct drive and an under drive, the ratio of the latter being selected to fall between any two ratios provided by transmission 12. Thus, if there is a difference of 0.50 between the ratios provided by transmission 12, the ratio provided by gears 28, 43, 45 and 46 would be 0.25. The auxiliary two-speed transmission is designed to operate normally in direct drive and to down-shift under the control of the driver into the under drive when an emergency situation requiring greater acceleration is presented, upon the termination of which the transmission will again automatically shift back into direct drive.

The shift into direct drive is effected by a shift fork 59 riding in a groove 60 formed in gear 32 adjacent teeth 35. Said fork 59 has a hub 61 mounted for axial slidable movement on a shift rail 62 extending between and mounted in end walls 20 and 21. A compression spring 63 is threaded over shift rail 62 and is compressed between end wall 21 and hub 61 so as normally to urge gear 32 toward gear 28 to engage teeth 35 with teeth 34 for a positive direct drive therebetween. Teeth 45 and 46 are helical teeth, the direction of the helix being such that when drive is transmitted from gear 44 to gear 32, the latter will tend to move away from gear 28, and hence the torque reaction between gear 44 and gear 32 will be such as to tend to hold teeth 35 out of engagement with teeth 34 as long as drive is being transmitted through the gears. When the shift into direct drive is to take place, the slowing down of the engine, together with the momentum of the vehicle will effect a reversal of torque between gears 44 and 32 and the spline reaction will then be in the opposite direction and will assist fork 59 in shifting the gear 32 toward teeth 34.

While a direct drive is in effect between gears 28 and 32, one-way clutch 51 is disengaged and is "free-wheeling." Under certain conditions of operation of a vehicle it is possible to cause one-way clutch 51 to lock up while teeth 34, 35 are engaged for direct drive, thereby locking the entire transmission against rotation in either direction. For example, most loading platforms are approached by a ramp which has a 2° or 3° incline. Rather than shift into reverse and back the truck down the ramp, the driver frequently simply releases the engine clutch and allows the truck to roll backward to the platform by gravity. Direct drive clutch teeth 34 and 35 are normally engaged, and the rolling back of the truck causes an attempted reverse rotation of gear 32 and a corresponding reverse rotation of countershaft gear 44, resulting in a locking up of one-way clutch 51. Since the weight of the truck is applied to clutch 51, it will lock up so tightly that it will be released with great difficulty, if at all, and may well be permanently damaged.

The foregoing undesirable condition is obviated in the present transmission by providing a control for cage 54 which positively holds rollers 53 in a released or disengaged position relative to surfaces 50 and 52. It may be noted that a plurality of teeth 64 are formed on the outer periphery of flange 55 of cage 54. These teeth 64 are adapted to be aligned with teeth 49 on stepped region 47 and held in such alignment by a shift collar 65 having internal teeth 66 in mesh with teeth 49. The disposition of teeth 64 relative to rollers 53 is such that when teeth 64 are aligned with teeth 49 and are held in such alignment by shifting collar 65 to the left to bridge both sets of teeth 64 and 49, rollers 53 will be disposed in the middle of the surfaces 50 where they will be out of contact with either surfaces 50 or cylindrical surface 52. As long as collar 65 remains shifted to the left as viewed in Fig. 3 to hold teeth 64 in alignment with teeth 49, rollers 53 cannot move in a counterclockwise direction as viewed in Fig. 4 into a wedging position relative to surfaces 50 and 52. Clutch 51 is thus positively held in a disengaged condition in spite of any reverse rotation which may be present during the operation of the transmission.

Since teeth 64 are to be aligned with teeth 49 when gear 32 is shifted to the left as viewed in Fig. 3, it is desirable that shift collar 65 move with fork 59. To this end, collar 65 is formed with a peripheral groove 67 (Fig. 4) in which rides a shift fork 68 having a hub 69 axially slidable on a shift rail 70. The shift rail 70 is disposed below and parallel with shift rail 62. Hub 69 has a notch 71 formed in the side thereof (Fig. 6) in which is disposed a lug 72 depending from hub 61 of shift fork 59. Thus shift forks 59 and 68 are interlocked mechanically and are constrained to move together at all times. A spring 73 may be threaded over shift rail 70 and compressed between end wall 21 and shift fork 68 to assist spring 63 in urging shift fork 59 and its connected shift fork 68 to the right as viewed in Fig. 6, that is, for the engaged position of teeth 34 and 35.

Inasmuch as teeth 64 on cage 54 may not be initially in alignment with teeth 49 on stepped region 47, the adjacent ends of teeth 64 and of teeth 66 on collar 65 are rounded in a conventional manner to provide a slight camming action and a rotational component of force which may be relied upon to rotate cage 54 slightly in the direction necessary to effect the alignment of teeth 64 with teeth 49.

It is contemplated that the operation of the auxiliary two-speed transmission shall be semi-automatic and that the shift into the lower ratio provided by the transmission shall be effected as an adjunct to the operation of the accelerator pedal of the vehicle. The means by which such control is effected will now be described.

Referring now to Figs. 4 and 5, hub 61 of shift fork 59 has a vertically disposed notch 74 in the side thereof adjacent the side wall 75 of the transmission housing 19. A rock shaft 76 is supported in a boss 77 formed in side wall 75, shaft 76 extending through the boss into the interior of housing 19. A shift lever 78 is secured to the inner end of rock shaft 76 and extends upwardly into the notch 74 in shift rail hub 61. Oscillations of rock shaft 76 are thus translated through lever 78 and notch 74 into reciprocations of hub 61 and hence engagement and disengagement of teeth 34 and 35 can be effected from the exterior of transmission 18 by oscillating rock shaft 76.

Referring now to Fig. 2, rock shaft 76 is shown schematically therein and has secured to the exterior end thereof a lever 79 which, in turn, is connected to the operative rod 80 of a vacuum or other pressure differential operated motor 81. For purposes of illustration, motor 81 will be described as a vacuum operated motor and may be of any of the well known and commercially available forms. The low pressure side of vacuum motor 81 is connected through a pipe 82 to a T 83, one side of which is connected to the low side of a second vacuum operated motor 84 and the other side is connected through a valve 85 and a pipe 86 to a vacuum tank or accumulator 87. A pipe 88 connects vacuum tank 87 to a suitable source of subatmospheric pressure which may be a pump on the vehicle specifically designed to produce subatmospheric pressures, or it may be a connection to the throat of the carburetor shown generally at 89 to make use of the vacuum produced in the suction side of the engine 10.

Valve 85 is controlled by a solenoid 90, one side 91 of which is grounded and the other side 92 is connected to one of the contacts 115 of a switch 93 disposed on the side wall 75 of transmission housing 19 (Fig. 5). The other of the contacts 115 of switch 93 is connected to a fixed contact 94 of a switch 95 having a plunger 96 extending upward under accelerator pedal 97. The free end of plunger 96 is normally disposed slightly above the position occupied by accelerator pedal 97 when it is depressed to its position corresponding to a wide open throttle position of carburetor 89. The movable contact 98 of switch 95 is connected to a battery 99, the other side of which is grounded.

Accelerator pedal 97 is connected to a link 100 the free end of which is connected through a bell crank 101 to a rod 102 having a lost motion connection with the end 103 of throttle lever 104, the opposite end 105 of which is bifurcated at 106 to embrace the operative rod 107 of vacuum motor 84. An abutment 108, adjustable along rod 107, is provided near the free end thereof. Abutment 108 is normally disposed at the position occupied by throttle lever 104 when said throttle lever is at the wide open throttle position.

Movement of rod 102 to the left as viewed in Fig. 2 is transmitted to end 103 of lever 104 through the aforesaid lost motion connection which is comprised of a spring 109 one end of which abuts on end 103 of lever 104 and the other end of which contacts abutment 110 on rod 102. The abutment 110 may be adjustable on rod 102 to alter the position of lever 104 relative to pedal 97.

Under normal conditions of operation, accelerator pedal 97 may be depressed and operated in the usual manner, the movement of the pedal being transmitted through link 100, bell crank 101 and rod 102 to abutment 110. Spring 109 then transmits the movement to end 103 of lever 104 to oscillate said lever about its fulcrum and to operate the throttle valve (not shown) associated therewith. Due to the bifurcation 106 movement of the lever 104 may be effected without a corresponding movement of rod 107.

When it is desired to cause transmission 18 to down shift from direct drive to the under drive provided therein, accelerator pedal 97 is depressed until it strikes plunger 96, and then by a continued downward movement thereof, switch 95 is closed to connect battery 99 through switch 95 and switch 93 to solenoid 90. It is contemplated that switch 93 will be closed when the transmission is in direct drive. This operation is insured by causing the plunger 111 (Fig. 5) of said switch to extend into the transmission and into the path of movement of a finger 112 formed on hub 61 of shift fork 59 and having a cam surface 113 adapted to be contacted by said plunger when shift fork 59 has moved gear 32 rearwardly of the transmission to disengage teeth 35 from teeth 34, and to allow plunger 111 to move inwardly under the action of a spring 114 to connect contacts 115 when hub 61 and shift fork 59 are moved to the left as viewed in Fig. 3 to engage teeth 35 with teeth 34.

The energization of solenoid 90 causes valve 85 to open and to exhaust the air from the low side of motors 84 and 81 through vacuum tank 87. The operation of motor 84 causes its rod 107 to move to the left as viewed in Fig. 2, thereby causing abutment 108 to strike bifurcation 106 and oscillate lever 104 to the closed throttle position. This may be accomplished despite the depressed position of accelerator pedal 97 by reason of the spring 109 and the lost motion connection between rod 102 and end 103 of lever 104. Thus spring 109 will be compressed and accelerator pedal 97 may remain in its depressed position despite the fact that the throttle has been moved to its closed position by vacuum motor 84.

Vacuum motor 81 when energized will move its rod 80 to the right as viewed in Fig. 2 and will cause rock shaft 76 to rock in a counterclockwise direction which in turn causes hub 61 of shift fork 59 to move toward end wall 21. Such movement of shift fork 59 causes a disengaging force to be impressed upon teeth 35. It may be observed that although teeth 35 cannot be disengaged from teeth 34 while torque is being transmitted from teeth 34 to teeth 35, the simultaneous operation of throttle lever 104 to the closed throttle position and the biasing of shift fork 59 to the released position of teeth 35 causes a reduction in torque in teeth 34 which, because of the inertia of the vehicle and hence the relatively constant rotation of gear 32, results in a relative reversal of direction of drive such as is requisite for the disengagement of said teeth 35.

Just as soon as shift fork 59 moves to its rearward position corresponding to a disengaged position of teeth 35 relative to teeth 34, finger 112 will contact plunger 111 of switch 93 and will cam it outwardly relative to housing 19 and thereby disconnect contacts 115 thereof. With contacts 115 disconnected, solenoid 90 is deenergized and motor 84 becomes inoperative, thereby releasing plunger 107 to move to the right as viewed in Fig. 2 to the position shown therein. The throttle valve follows abutment 108 to the position dictated by accelerator pedal 97 and drive is then resumed through engine 10 to gear 28. With the direct drive disengaged in transmission 18, the drive is then from gear 28 through gear 43, free wheeling clutch 51, gear 45 and gear 32 to shaft 25 in a reduced speed, higher torque, ratio.

Although under these conditions motor 81 is likewise deenergized so that rod 80 tends to oscillate rock shaft 76 in a clockwise direction to shift fork 59 to engage teeth 35 with teeth 34, said teeth will be kept apart by the reaction of the drive through the helical teeth on gears 32 and 44 which forces gear 32 to the rear away from teeth 34.

When the driver wishes to resume a direct drive through transmission 18, or when the emergency is past so that accelerator pedal 97 may be released, such release of the accelerator pedal will rotate throttle lever 104 to the closed or partially closed throttle position which, in turn, will slow down engine 10. The momentum of the vehicle, however, will cause gear 32 to continue to rotate at substantially a constant speed and hence the slowing down of engine 10 and the associated gear 28 will cause a relative reversal of drive between teeth 34 and 35 so that whereas in under drive, teeth 34 were rotating at a faster speed than teeth 35, with the slowing down of gear 28 teeth 34 will now tend to rotate at a slower speed than teeth 35. With spring 63 continuously urging shift fork 59 and teeth 35 toward teeth 34, the aforesaid relative reversal of drive will immediately cause an engagement of these teeth. Simultaneously with the engagement of teeth 35 with teeth 34, collar 65 will be moved to the left as viewed in Fig. 3 to engage teeth 64 and thereby hold the rollers in their disengaged positions.

When teeth 35 are engaged with teeth 34, that is, when hub 61 of shift fork 59 has moved downward as viewed in Fig. 5, plunger 111 of switch 93 will be free to move to the right in that figure and to close contacts 115 so that switch 93 is then in readiness for the next closing of switch 95 to energize solenoid 90.

Although this invention has been described with reference to its application to trucks it may be applied with equal facility to buses, farm tractors, tanks and other vehicles wherein a sudden increase of power is desirable or necessary to take care of an emergency situation. It is understood, therefore, that the foregoing description is merely illustrative of a preferred embodiment of the invention, and that the scope of the invention is not to be limited thereto but is to be determined by the appended claims.

I claim:

1. In combination, an engine having a pedal operated throttle for controlling the power developed thereby, a step type variable speed transmission for transmitting the power from the engine to a load, a change speed transmission interposed between the engine and the load in series with the step type transmission, said change speed transmission being adapted to produce a change in speed ratio between the engine and load which is less than the change in speed ratio produced by one of the steps in the variable speed transmission, and means operable in conjunction with the operation of the pedal for effecting a change in speed ratio in the change speed transmission.

2. In combination, an engine having a pedal operated throttle for controlling the power developed thereby, a step type variable speed transmission for transmitting the power from the engine to a load, a change speed transmission interposed between the engine and the load in series with the step type transmission, said change speed transmission being adapted to produce a direct drive therethrough and a reduced speed ratio drive between the engine and load which is less than the change in speed ratio produced by one of the steps in the variable speed transmission, and means operable in conjunction with the operation of the pedal for effecting a change from direct drive to the reduced speed ratio drive in the change speed transmission.

3. In combination, an engine having a throttle for controlling the power developed thereby, a step type variable speed transmission for transmitting power from the engine to a load, a change speed transmission interposed between the engine and the load, said change speed transmission including a jaw clutch for effecting a direct drive therethrough when the clutch is engaged and an overrunning clutch for rendering effective a reduced speed ratio drive between the engine and load which is less than the change in speed ratio produced by one of the steps in the variable speed transmission, and means for automatically simultaneously closing the throttle and disengaging the jaw clutch to produce said reduced speed ratio drive.

4. The combination described in claim 3, said means for automatically closing the throttle and disengaging the jaw clutch comprising a pressure differential motor, means for connecting the motor to the throttle, a second pressure differential motor, means for connecting the second motor to the jaw clutch, means for energizing both motors simultaneously to close the throttle when the jaw clutch is to be engaged, and means movable with the jaw clutch for deenergizing both motors when the jaw clutch is disengaged.

5. The combination described in claim 3, said means for automatically closing the throttle and for disengaging the jaw clutch comprising a pressure differential motor, means for connecting the motor to the throttle, a second pressure differential motor, means for connecting the second motor to the jaw clutch, means connected to the motors for establishing a pressure differential therein, a valve interposed between the pressure differential establishing means and the motors, electromagnetic means for operating the valve, an accelerator pedal for operating the throttle and a pair of switches connected in series with one another and with the electromagnetic means, one switch being normally open and closed by the accelerator pedal upon movement of the pedal to a position corresponding to a wide open position of the throttle and the other being normally closed and operated by the jaw clutch when the clutch is disengaged to open the circuit to the electromagnet.

6. In combination, an engine having a throttle for controlling the power developed thereby, a stepped type variable speed transmission for transmitting power from the engine to a load, a change speed transmission interposed between the engine and the load, said change speed transmission including a first jaw clutch for effecting a direct drive therethrough when the clutch is engaged and an overrunning clutch for rendering effective a reduced speed ratio drive between the engine and load which is less than the change in speed ratio produced by one of the steps in the variable speed transmission, a second jaw clutch for rendering the overrunning clutch ineffective, means for interlocking the first and second jaw clutches for simultaneous operation such that the overrunning clutch is rendered ineffective when the first jaw clutch is effective for producing a direct drive through the transmission, and means for automatically simultaneously closing the throttle and disengaging the first jaw clutch to produce said reduced speed ratio drive.

7. The combination described in claim 6, said overrunning clutch including a plurality of rollers, a cage for circumferentially spacing said rollers, a plurality of cams for cooperation with the rollers to effect a one-way drive, and a flange extending radially outwardly from said cage, and said second jaw clutch including teeth on the flange on the cage, said cams having fixed thereto a plurality of teeth, and said clutch including further means for connecting the teeth on the flange with the teeth adjacent the cams.

8. A change speed transmission comprising aligned input and output shafts, a countershaft, an input gear on the input shaft, a gear on the countershaft meshing with the input gear, an output gear on the output shaft, a second gear on the countershaft meshing with the output gear, a one-way clutch for driving the second countershaft gear from the first countershaft gear, positive clutch means for connecting the input and output gears together, and means for preventing operation of the one-way clutch while the positive clutch means is operative to connect the input and output gears together, said one-way clutch comprising cams on one countershaft gear, a cylindrical surface on the other countershaft gear radially spaced from and in telescopic relation to the cams, rollers in the space between the cylindrical surface and cams, and a cage for holding the rollers in circumferentially spaced relation, and said means for preventing operation of the one-way clutch comprising a positive clutch for fixing the position of the cage relative to the cams, a shift fork for operating the positive clutch, a second shift fork for operating the positive clutch for fixing the position of the cage, and means for interlocking the two shift forks to compel movement of one fork with the other.

9. A change speed transmission as described in claim 8, the means for interlocking the two shift forks comprising a lug on one of said forks, the other of said forks having a notch into which the lug extends.

10. In combination a change speed transmission as described in claim 8, and an engine having a throttle for controlling the power developed thereby, said change speed transmission being interposed between the engine and a load, and means for automatically simultaneously closing the throttle and operating the shift lever to effect a change in the speed ratio produced by the change speed transmission.

References Cited in the file of this patent

UNITED STATES PATENTS

| | | |
|---|---|---|
| 2,403,378 | Kilpela | July 2, 1946 |
| 2,453,794 | Iavelli | Nov. 16, 1948 |
| 2,455,933 | Iavelli et al. | Dec. 14, 1948 |
| 2,567,446 | Polomski | Sept. 11, 1951 |